United States Statutory Invention Registration [19]

[11] Reg. Number: H595

Lafaw [43] Published: Mar. 7, 1989

[54] FIELD SPLICE ASSEMBLY FOR TACTICAL FIBER OPTIC CABLE

[75] Inventor: Donald A. Lafaw, Rome, N.Y.

[73] Assignee: The United States of America as represented by the Secretary of the Air Force, Washington, D.C.

[21] Appl. No.: 73,615

[22] Filed: Jul. 15, 1987

[51] Int. Cl.[4] ..... G02B 6/38

[52] U.S. Cl. ..... 350/96.21; 174/50; 174/92

[58] Field of Search ..... 350/96.21; 174/50, 92

[56] References Cited

U.S. PATENT DOCUMENTS

| | | | |
|---|---|---|---|
| Re. 31,515 | 2/1984 | Heldt | 350/96.21 |
| 3,914,880 | 10/1975 | Dakss et al. | 350/96 C |
| 3,972,585 | 8/1976 | Dalgleish et al. | 350/96 C |
| 3,992,569 | 11/1976 | Hankins et al. | 174/92 |
| 4,213,671 | 7/1980 | Lambert | 350/96.21 |
| 4,254,865 | 3/1981 | Pacey et al. | 206/316 |
| 4,257,674 | 3/1981 | Griffin et al. | 350/96.21 |
| 4,261,644 | 4/1981 | Giannaris | 350/96.21 |
| 4,556,282 | 12/1985 | Delebecque | 350/96.21 |

OTHER PUBLICATIONS

Standard Underground Cable Co., "Cable Junction Boxes", Pittsburgh, Pa. 1918, pp. 1, 32 and 33.

*Primary Examiner*—Stephen C. Buczinski
*Assistant Examiner*—Linda J. Wallace
*Attorney, Agent, or Firm*—Bobby D. Scearce; Donald J. Singer

[57] ABSTRACT

An optical fiber connector assembly and method for splicing a broken fiber optic cable is described which includes first and second elements joinable in a mated condition along respective first and second mating surfaces; first and second grooves in the mating surfaces extending essentially the lengths of the surfaces and defining a channel of preselected size through the assembly in the mated condition for receiving the cable sheath within the assembly in the mated condition; a cavity in one of the mating surfaces for receiving the abutting optical fiber ends; an adhesive for holding the optical fiber ends in abutting relationship; an ambient temperature curing material sealing the mating surfaces from moisture and foreign substances and fixing the abutting optical fiber ends within the assembly; and a plurality of screws for assembling the elements.

12 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIELD SPLICE ASSEMBLY FOR TACTICAL FIBER OPTIC CABLE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to connectors for optical fibers, and more particularly to a splice assembly for a broken optical fiber cable.

Optical fibers have found substantial use as optical data links in communications systems. Accompanying this use have arisen in the maintenance and repair of fiber optic systems reguirements for devices and methods for rapid, efficient and effective splicing of optical fibers. Consequently, development of fiber optic splices characterized by low optical transmission losses has received substantial attention in the telecommunications industry. Two basic methods for making optical fiber splices have been developed, viz. fusion splicing and mechanical splicing. Fusion splicing involves the exact positioning and melting together of two abutting fiber ends, usually by an electric arc. In fusion splicing of optical fibers within current technology, precise positioning apparatus and relatively large and bulky equipment are required to make splices having low transmission losses of the order of 0.05 dB or less. Mechanical splices, in which the fibers are joined (butted) together but are not melted or fused together, are generally easier to make but usually have optical transmission losses higher than that of fusion splices. In making a mechanical splice, strain relief for the abutting fibers must be provided to keep the relatively fragile glass fibers from being broken by further handling. An enclosure for the splice is usually included in the connecting assembly for retaining the sheathing of the cable in order to accommodate loads which may be placed on the cable.

Tactical fiber optic cable is designed for rugged physical environments. such as vehicle roll-overs and temperature extremes, to which normal telecommunications grade fiber optic cable is not exposed. If a tactical fiber optic cable is damaged in a military environment, it must be spliced quickly and effectively. Ideally, such a splice has low optical transmission loss, is easy to make, and does not require special tools or extensive operator training.

Current practice for field repair of two-fiber tactical fiber optical cable includes use of a splice kit comprising a splicing machine and various hand tools required for construction of the splice, all carried within a $17\times18\times15$ inch container and weighing about 25 pounds. The splice assembly made using the kit includes a $1.25\times1\times10$ inch housing and strain relief for the splice requires fastening the synthetic fiber strength members within crimped sleeves. The kit is cumbersome and expensive and requires special tools, precision use and specialized training of operators.

The present invention provides assembly and method for splicing a broken fiber optic cable under severe field service conditions without expensive, complicated or heavy tools or equipment. Splicing optical fibers according to the invention is performed by cutting away portions of the cable to expose the broken ends of the optical fibers, cleaving the fiber ends and adhesively fixing the ends in abutting relationship within elastomeric, tubular splice assemblies, and fixing the splice assemblies within plastic or epoxy material in a two-part protective housing. The splice may be made by a minimally trained operator in 15 minutes or less, and is usually characterized by a transmission loss of 0.5 dB or less.

It is therefore a principal object of the invention to provide a connector structure for splicing a broken optical fiber.

It is a further object of the invention to provide a rugged, inexpensive and easily assembled splice for field repair of a fiber optic cable.

It is yet another object of the invention to provide a simple and effective method for rapid repair of fiber optic cables.

These and other objects of the invention will become apparent as the detailed description of representative embodiments proceeds.

SUMMARY OF THE INVENTION

In accordance with the foregoing principles and objects of the invention, an optical fiber connector assembly and method for splicing a broken fiber optic cable is described which includes first and second elements joinable in a mated condition along respective first and second mating surfaces; first and second grooves in the mating surfaces extending essentially the lengths of the surfaces and defining a channel of preselected size through the assembly in the mated condition for receiving the cable sheath within the assembly in the mated condition; a cavity in one of the mating surfaces for receiving the abutting optical fiber ends; an adhesive for holding the optical fiber ends in abutting relationship; an ambient temperature curing material sealing the mating surfaces from moisture and foreign substances and fixing the abutting optical fiber ends within the assembly; and a plurality of screws for assembling the elements.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
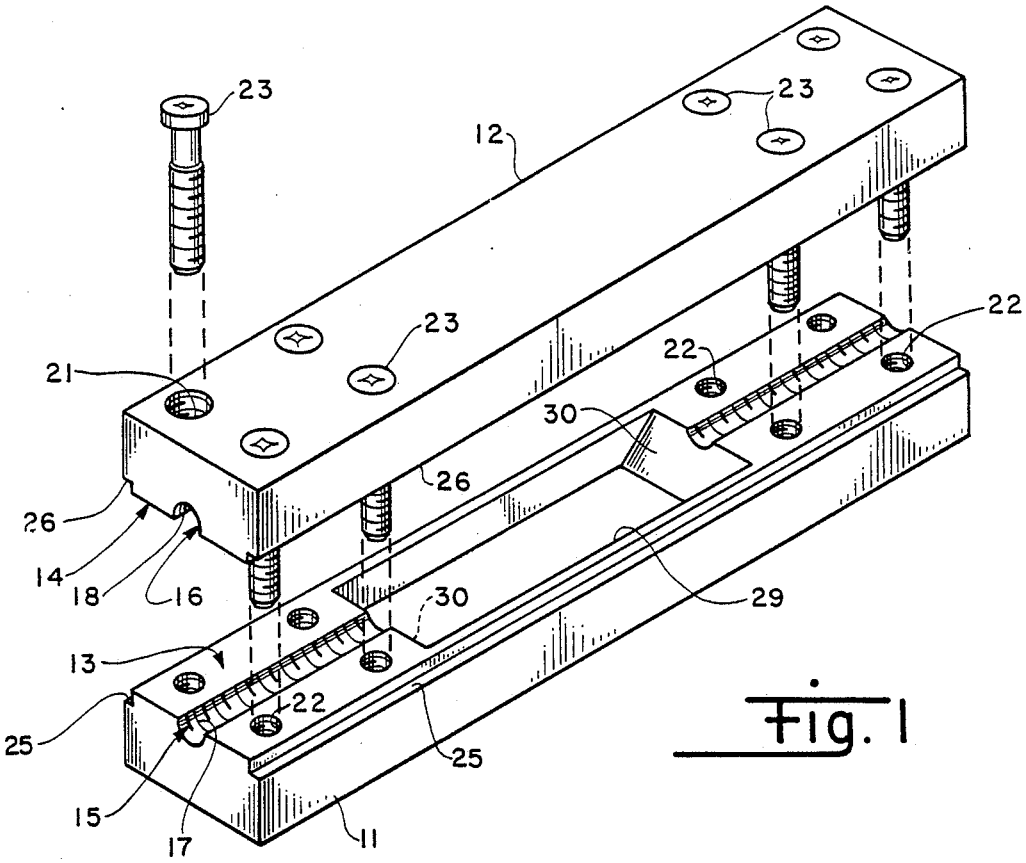
FIG. 1 is an exploded isometric view of a splice assembly housing structure of the invention.

Referring now to FIG. 1, shown therein is an exploded isometric view of a field splice housing assembly 10 structure of the invention. In the preferred configuration depicted in FIG. 1, assembly 10 comprises a pair of substantially rectangularly shaped portions 11,12 presenting respective confronting and mating surfaces 13,14. Surfaces 13,14 have defined therein respective longitudinal grooves 15,16 extending lengthwise of the respective portions 11,12. Grooves 15,16 are configured to register with each other in the assembled condition to define a channel for receiving and holding the fiber optic cable sheath as described below. Grooves 15,16 therefore preferably include a plurality of annular or longitudinal striations 17,18 providing gripping surfaces for the cable sheath. Portions 11,12 may be constructed of any suitable material and by any suitable process as would occur to one skilled in the appropriate art, the same not being limiting of this invention. Accordingly, aluminum, plastic, epoxy, fiber glass, nylon, or other structural material may be selected, and portions 11,12 may be cast, injection molded or otherwise formed depending on the material selected. Weight restrictions on assembly 10 may dictate selection of a lightweight material. One representative fabrication method for portions 11,12 comprises selecting a piece of stock of the selected material having size corresponding to the desired overall length and cross section of the completed assembly 10 structure. The overall size of assembly 10 may be selected over a wide range, and may be small to facilitate winding of a spliced cable on a reel. The piece of stock is drilled lengthwise to a bore size corresponding to the intended channel diameter for accommodating the cable to be spliced. The resulting drilled hole is tapped or otherwise scored to provide striations 17,18, and the piece of stock is then cut lengthwise along the axis of the drilled hole to provide portions 11,12. In an assembly 10 built in demonstration of the invention a piece of one-inch square aluminum bar stock about seven inches long was drilled lengthwise to about 0.219 inch diameter (about 0.1 inch smaller than the diameter of the cable sheath to be clamped), and cut to provide the representative configuration for portions 11,12 shown in FIG. 1. Portions 11,12 are illustrated in FIG. 1 as each having a rectangular cross section, but may be fabricated from stock in other shapes (e.g., round stock), of any preselected length consistent with space availability for the cable splice.

A plurality of holes 21 are drilled through portion 12 in registration with a corresponding plurality of tapped holes 22 in portion 11 for receiving screws 23 (eight in the demonstration unit) for assembly of portions 11,12. Screws 23 may be held captive in portion 11 for convenience and to avoid loss of one or more of them. Confronting shoulders 25,26 may be machined in portions 11,12 substantially as shown to provide a groove to receive excess sealing material in the assembly of the portions 11,12 described below. Drilling and tapping of holes 21,22 may be performed in the piece of stock prior to the lengthwise cut just mentioned to ensure precision alignability of portions 11,12. Further, grooves of appropriate size may be machined on corresponding opposite sides of the piece of stock which following the lengthwise cut, define shoulders 25,26. Use of nylon screws 23 with plastic, epoxy or nylon structural material for portions 11,12 provides an all-dielectric assembly housing having no metallic components.

A cavity 29 of appropriate preselected size is machined or otherwise formed into one of portions 11,12, substantially as shown in FIG. 1, to receive the optical fiber ends to be spliced. In the demonstraton unit, cavity 29 was about three inches long by 0.75 inch wide by 0.30 inch deep. Cavity 29 may be tapered at ramps 30 to facilitate placement of fiber ends therein as described below and to eliminate sharp edges which might otherwise cut into a spliced fiber in the assembly.

Figure 2:
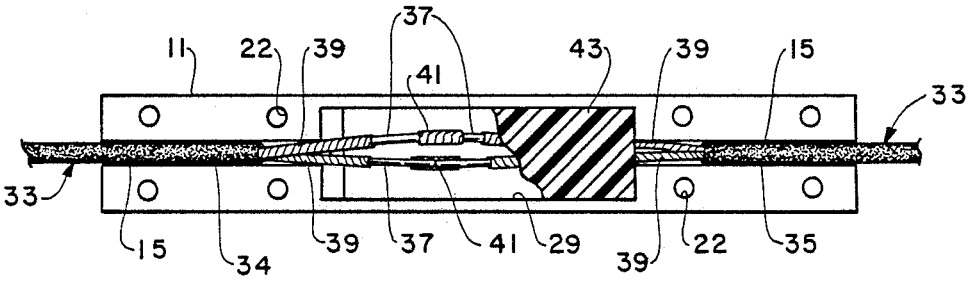
FIG. 2 is a plan view of a fiber optic cable splice assembly structure of the invention.

Referring now additionally to FIG. 2, shown therein is a plan view of a fiber splice assembly according to the invention with (top) portion 12 removed. The damaged portion of a fiber optic cable 33 is cut away and discarded, which results in cable ends 34,35 to be spliced. The sheathing of each end 34,35 is stripped back a preselected length (about two inches), and the synthetic fiber strands and other tensile strength members are cut away to expose the plurality of optical fibers 37 within cable 33. Any plurality of fibers 37 (about 0.0087 to 0.035 inch diameter) may be included in cable 33, and the two fibers shown in FIG. 2 are only representative of that plurality. The buffering (plasticlike) compound layer 39 on each fiber is stripped off, leaving about 0.75 inch of buffering layer 39 between respective fibers 37 and the sheathing of cable ends 34,35. Fibers 37 are cleaved with a carbide tipped cleaving pen or other sharp blade a preselected length (about ½ inch) from the buffering. Various appropriate lengths for stripping sheathing from cable 33 and buffering layer 39 from fibers 37 and for cleaving fibers 37 in assembling the splice may be indicated on a gauge scribed on the underside of portion 11 as a convenient guide to an operator performing a splice, as this may vary according to the exact type of splicing method chosen. Corresponding fiber 37 ends are then joined in abutting relationship within an elastomeric sheath 41 of inner diameter corresponding to that of fibers 37 and about one inch long, and an appropriate epoxy or other adhesive is applied to fibers 37 at the ends of the elastomeric sheath to hold the fiber ends in abutting relationship. Other readily available splicing techniques may be used in place of the elastomeric sheath, such as bent rod, V-groove or rotary termini splices, providing the splice used may be contained with cavity 29. Cable 33 with corresponding fiber 37 ends joined as just described is then inserted into portion 11 with the spliced fiber 37 joints lying within cavity 29.

A gasket forming or similar ambient (or room temperature) curing sealing material 43 is poured into or otherwise liberally applied to cavity 29 and the mating surfaces around cable 33 lying in groove 15 to fix the spliced fiber 37 joints in place. Material 43 may comprise any suitable substantially room temperature curing plastic, epoxy or elastomeric material such as silicone rubber sealant, RTV or automotive gasket compound, as would occur to the skilled artisan guided by these teachings. Material 43, when set, substantially fills cavity 29 and serves both to hold the fiber 37 ends in abutting relationship and to seal the splice against intrusion by water. Portion 12 is then mated to portion 11 and screws 23 tightened firmly to form assembly 10. Excess gasket material 43 is removed and, if desired, the entire assembly 10 is wrapped with electrical or other suitable tape for additional protection.

Tests conducted on the demonstration unit described above to determine losses incurred by the compressive force of the splice assembly on the cable showed an average compressive loss of about 0.03 dB, Strain relief tests on the splice assembly to determine the force required to pull the cable ends from the assembly indicated that the assembly will stand a minimum of 200 pounds.

The invention therefore provides a novel splice assembly and method for connecting broken optical fibers. Expensive special tools to perform a splice are not required, since only normal hand tools, such as a hex wrench, sharp blade and/or screwdriver, pliers or small wrench may be used. The clamping action of the assembly provides strain relief for the spliced cable. The assembly is inexpensive and splicing operation of the invention may be performed by operators without specialized training.

It is understood that certain modifications to the invention may be made as might occur to one with skill in the field of the invention within the scope of the appended claims. All embodiments contemplated hereunder which accomplish the objects of the invention have therefore not been shown in complete detail. Other embodiments may be developed without departing from the spirit of the invention or from the scope of the appended claims.

I claim:

1. An assembly for splicing abutting ends of an optical fiber of a fiber optic cable having a sheath enclosing at least one said optical fiber comprising:

(a) first and second elements having respective first and second mating surfaces, said first and second elements being joinable in a mated condition along said first and second mating surfaces;

(b) means defining first and second grooves in respective said first and second mating surfaces, said first and second grooves extending lengthwise of said first and second mating surfaces and disposed on respective said first and second elements in configurating relationship to each other in said mated condition whereby a channel is defined through said assembly in said mated condition, said first and second grooves having preselected size corresponding to the size of said sheath of said cable for holding said sheath within said assembly in said mated condition;

(c) means defining a cavity in one of said mating surfaces for receiving the abutting ends of said optical fiber;

(d) adhesive means for holding said abutting ends of said optical fiber in abutting relationship;

(e) a plurality of striations on the surfaces defining said grooves for gripping said sheath of said cable; and (f) means for joining said first and second mating elements in said mated condition.

2. The assembly of claim 1 further comprising ambient temperature curing material within said cavity for holding said abutting ends of said optical fiber within said assembly.

3. The assembly of claim 2 wherein said ambient temperature curing material is selected from the group consisting of silicone rubber sealant, RTV, and gasket compound.

4. The assembly of claim 1 wherein said first and second mating elements comprise a material selected from the group consisting of aluminum, plastic, epoxy, fiber glass, and nylon.

5. The assembly of claim 1 wherein said means for joining said first and second mating elements in said mated condition comprises a plurality of screws.

6. The assembly of claim 1 wherein said adhesive means includes an elastomeric sheath for receiving said abutting ends of said optical fiber and an adhesive at each end of said elastomeric sheath for holding said abutting ends in abutting relationship.

7. A method for splicing abutting ends of an optical fiber of a fiber optic cable having a sheath enclosing at least one said optical fiber comprising:

(a) providing an assembly including:

(i) first and second elements having respective first and second mating surfaces, said first and second elements being joinable in a mated condition along said first and second mating surfaces;

(ii) means defining first and second grooves in respective said first and second mating surfaces, said first and second grooves extending lengthwise of said first and second mating surfaces and disposed on respective said first and second elements in confronting relationship to each other in said mated condition whereby a channel is defined through said assembly in said mated condition, said first and second grooves having preselected size corresponding to the size of said sheath of said cable and further including a plurality of striations on the surfaces defining said grooves for holding said sheath within said assembly in said mated condition; and (iii) means defining a cavity in one of said mating surfaces for receiving the abutting ends of said optical fiber;

(b) adhesively joining said abutting ends of said optical fiber in abutting relationship;

(c) inserting the adhesively joined said abutting ends of said optical fiber into said cavity with the sheath of corresponding ends of said cable lying within the groove of said one of said first and second mating surfaces;

(d) joining said first and second mating elements in said mated condition with said cable generally between said elements.

8. The method of claim 7 further comprising the step of filling said cavity with ambient temperature curing material for holding said abutting ends of said optical fiber within said assembly.

9. The method of claim 7 wherein said first and second mating elements comprise a material selected from the group consisting of aluminum, plastic, epoxy, fiber glass, and nylon.

10. The method of claim 7 wherein said step of joining said first and second mating elements in said mated condition with said cable generally between said elements is performed utilizing a plurality of screws.

11. The method of claim 8 wherein said ambient temperature curing material is selected from the group consisting of silicone rubber sealant, RTV, and gasket compound.

12. The method of claim 7 wherein said step of adhesively joining said abutting ends of said optical fiber in abutting relationship is performed utilizing an elastomeric sheath for receiving said abutting ends of said optical fiber and an adhesive at each end of said elastomeric sheath for holding said abutting ends in abutting relationship.

* * * * *